US010525815B2

(12) United States Patent
Witt et al.

(10) Patent No.: US 10,525,815 B2
(45) Date of Patent: Jan. 7, 2020

(54) TRANSMISSION SYSTEM FOR A VEHICLE, AND VEHICLE COMPRISING THE SAME

(71) Applicant: Schaeffler Technologies AG & Co. KG, Herzogenaurach (DE)

(72) Inventors: Holger Witt, Bühl (DE); Martin Vornehm, Bühl (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 24 days.

(21) Appl. No.: 15/778,228

(22) PCT Filed: Dec. 1, 2016

(86) PCT No.: PCT/DE2016/200570
§ 371 (c)(1),
(2) Date: May 23, 2018

(87) PCT Pub. No.: WO2017/101937
PCT Pub. Date: Jun. 22, 2017

(65) Prior Publication Data
US 2018/0345779 A1 Dec. 6, 2018

(30) Foreign Application Priority Data
Dec. 18, 2015 (DE) .................. 10 2015 226 007

(51) Int. Cl.
B60K 6/48 (2007.10)
B60K 6/365 (2007.10)
(Continued)

(52) U.S. Cl.
CPC ............... B60K 6/365 (2013.01); B60K 6/48 (2013.01); B60K 6/547 (2013.01); F16H 3/725 (2013.01);
(Continued)

(58) Field of Classification Search
CPC .......... B60K 6/365; B60K 6/48; B60K 6/547; B60K 2006/4816; F16H 3/725;
(Continued)

(56) References Cited

U.S. PATENT DOCUMENTS 7,232,393 B2 * 6/2007 Bucknor ................. B60L 50/16
475/5
8,021,256 B2 * 9/2011 Conlon .................. B60K 6/365
475/5
(Continued)

FOREIGN PATENT DOCUMENTS

DE 19903936 A1 5/2000
DE 102012201376 A1 8/2013
(Continued)

Primary Examiner — Leslie A Nicholson, III
(74) Attorney, Agent, or Firm — Kevin L. Parks

(57) ABSTRACT

A transmission for a vehicle includes first and second input interfaces, an output interface, first and second speed ratio transmission sections, first and second planetary transmission sections, and a coupling section. The first input interface is arranged for coupling to an internal combustion engine. The second input interface is arranged for coupling to an electric motor. The first planetary transmission section has an internal gear connected to the first input interface, a planet carrier connected to the second input interface, and a sun gear connected to an input of the first speed ratio transmission section. The second planetary transmission has an internal gear connected to the first input interface, a planet carrier connected to the second input interface, and a sun gear connected to an input of the second speed ratio transmission section. The coupling section supports the respective planet carriers against one another in at least one operating mode.

13 Claims, 13 Drawing Sheets

(51) Int. Cl.
*B60K 6/547* (2007.10)
*F16H 3/72* (2006.01)
*F16H 3/00* (2006.01)

(52) U.S. Cl.
CPC ...... *B60K 2006/4816* (2013.01); *F16H 3/006* (2013.01); *F16H 2200/2007* (2013.01)

(58) Field of Classification Search
CPC ............ F16H 3/006; F16H 2200/2007; Y02T 10/6221; Y02T 10/6256
USPC .......................................................... 475/5
See application file for complete search history.

(56) References Cited

U.S. PATENT DOCUMENTS

| | | | |
|---|---|---|---|
| 9,028,362 B2* | 5/2015 | He | B60K 6/105 |
| | | | 477/3 |
| 10,012,309 B2* | 7/2018 | Kumazaki | B60K 6/20 |
| 10,197,151 B2* | 2/2019 | Nishimine | F16H 57/0476 |
| 2005/0227801 A1 | 10/2005 | Schmidt et al. | |
| 2013/0312557 A1 | 11/2013 | Van Druten et al. | |

FOREIGN PATENT DOCUMENTS

| | | |
|---|---|---|
| DE | 102012201377 A1 | 8/2013 |
| DE | 102013111656 A1 | 5/2014 |
| DE | 112012006192 T5 | 12/2014 |
| FR | 3014773 A1 | 6/2015 |

* cited by examiner

Fig. 5

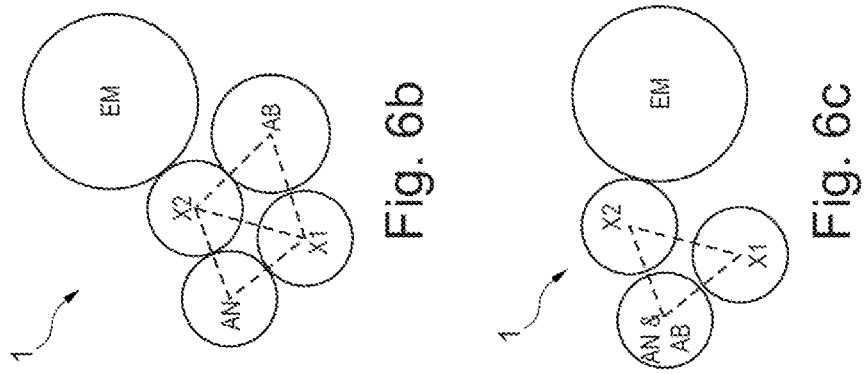
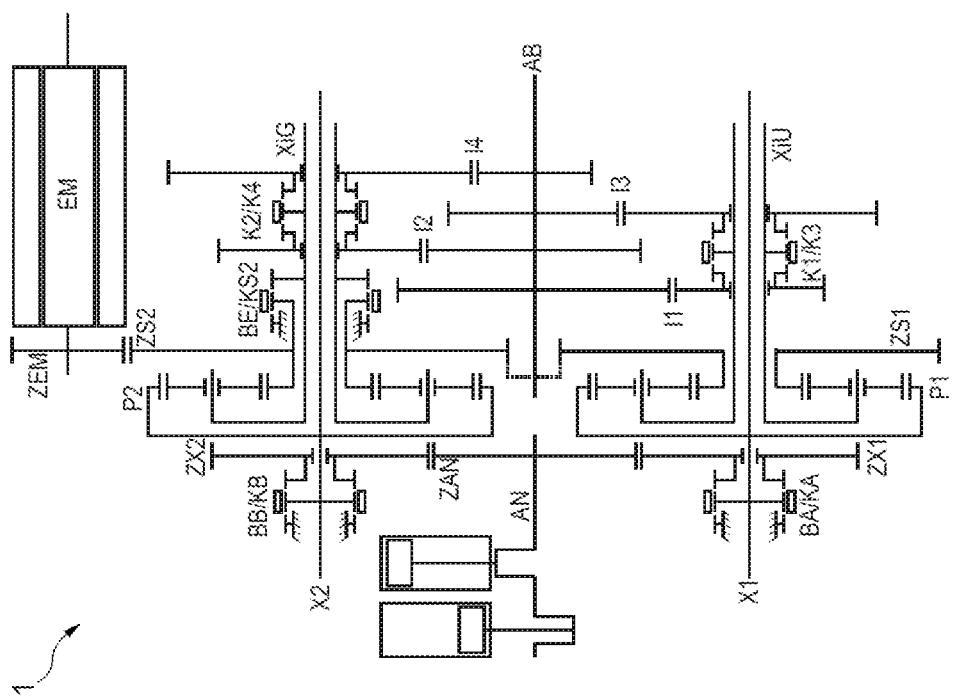

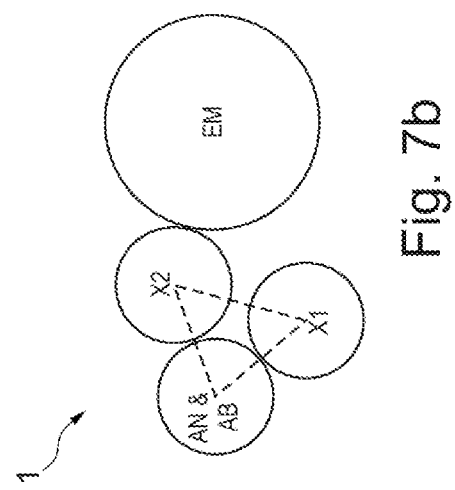
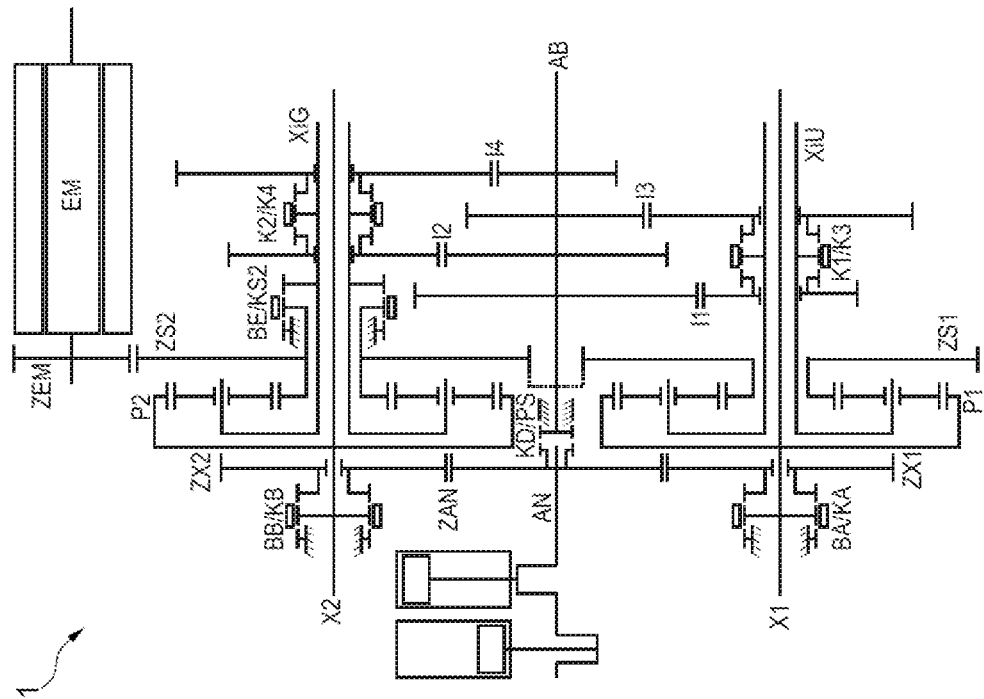

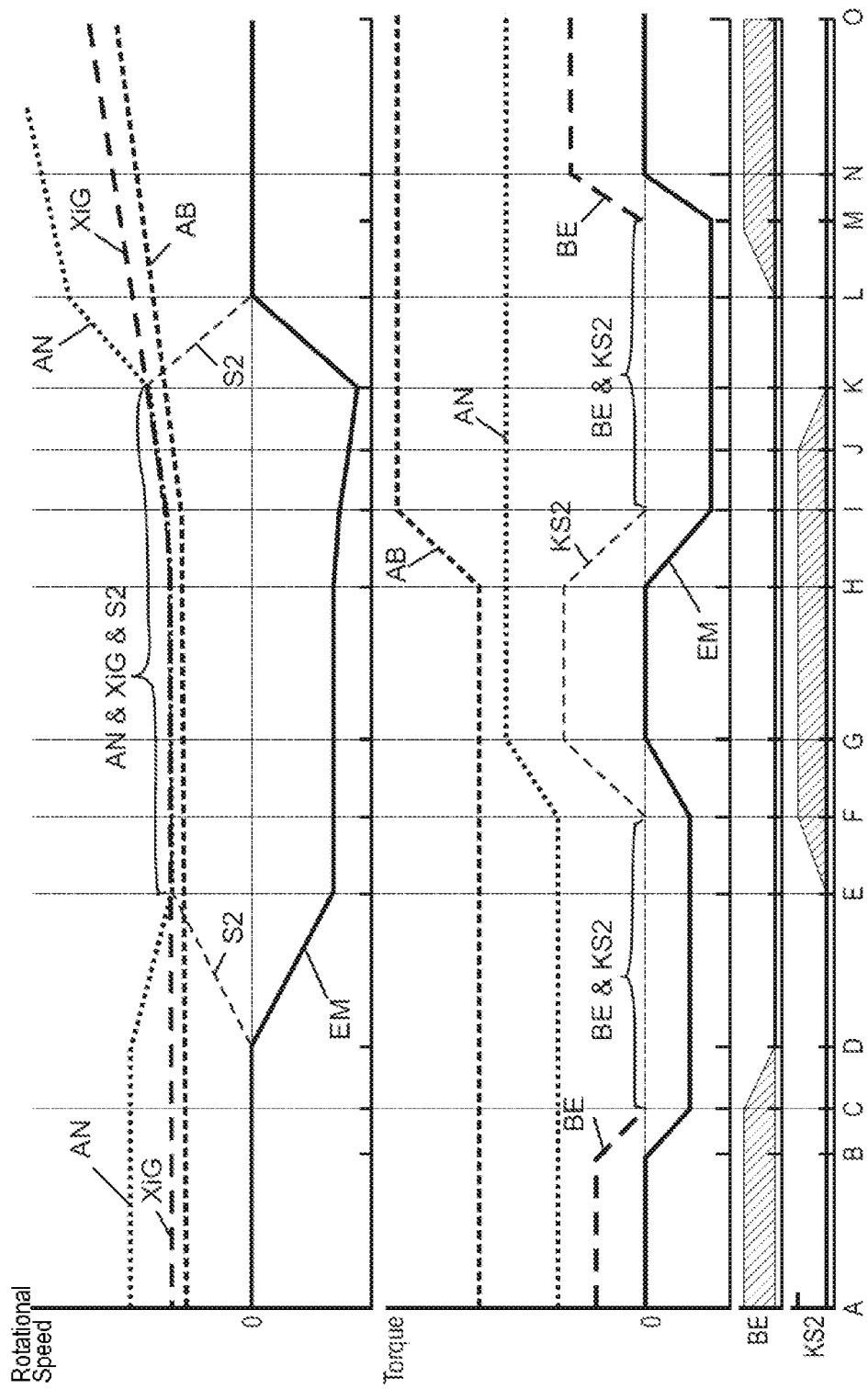

TRANSMISSION SYSTEM FOR A VEHICLE, AND VEHICLE COMPRISING THE SAME

CROSS-REFERENCE TO RELATED APPLICATIONS

This application is the United States National Phase of PCT Appln. No. PCT/DE2016/200570 filed Dec. 1, 2016, which claims priority to German Application No. DE102015226007.0 filed Dec. 18, 2015, the entire disclosures of which are incorporated by reference herein.

TECHNICAL FIELD

The disclosure relates to a transmission arrangement for a vehicle.

BACKGROUND

Vehicles with hybrid transmissions, that is to say with transmissions which permit the coupling of at least two motors as traction motors, have been proposed in a wide variety of embodiments. Such hybrid transmissions are known for example from the documents DE 11 2012 006 192, DE 10 2012 20 13 76 or from DE 10 2012 20 13 77. All architectures are based on the fundamental object of developing a hybrid transmission which constitutes an advantageous solution both with regard to the outlay in terms of construction and with regard to the possible functions and operating modes.

The present disclosure proposes a transmission arrangement for a vehicle which provides a wide variety of functions with low outlay in terms of construction. Embodiments of the disclosure emerge from the following description and from the appended figures.

The subject matter of the disclosure is a transmission arrangement, in particular a hybrid transmission arrangement for a vehicle. The vehicle may in particular be a passenger motor vehicle, heavy goods vehicle, bus etc. The transmission arrangement forms a part of the drive train and is designed to conduct a traction torque to driven wheels of the vehicle.

The transmission arrangement has a first input interface for the coupling of an internal combustion engine. The internal combustion engine optionally forms a part of the transmission arrangement. The internal combustion engine provides a traction torque for the vehicle. The input interface may be in the form of a real interface, or alternatively to this, the input interface is formed as a virtual or logical interface and is manifested for example as a shaft or the like.

The transmission arrangement furthermore has a second input interface for the coupling of an electric motor. The electric motor optionally forms a part of the transmission arrangement. The electric motor provides a traction torque for the vehicle. In particular, the electric motor is designed such that it alone can accelerate and/or propel the vehicle. The electric motor has a power of greater than 5 kilowatts, for example, and may be greater than 10 kilowatts. The second input interface may also be of real physical form, or alternatively to this, may form a virtual or logical interface, as has already been discussed with regard to the first input interface.

The transmission arrangement has a first planetary transmission section which has a first internal gear, a first planet carrier and a first sun gear as shafts. Furthermore, the first planetary transmission section may have a first set of planet gears, which are rotatably mounted on the first planet carrier.

In particular, the first internal gear and/or the first sun gear meshes with the planet gears of the first set of planet gears. The internal gear, planet carrier and sun gear will hereinafter be referred to as shafts. The expression "shafts" may also be applied to a shaft that is static during operation. A first of the three shafts of the first planetary transmission section is operatively connected to the first input interface. The first shaft may be rotationally fixedly connected or at least rotationally fixedly connectable to the first input interface. A second shaft of the first planetary transmission section is operatively connected to the second input interface. The second shaft may be rotationally fixedly connected to the second input interface. The first planetary transmission section may be formed as a spur-gear planetary transmission section. The first internal gear, the planet gears and the first sun gear are formed as gears which are toothed in encircling fashion and/or on the face side.

Furthermore, the transmission arrangement has a second planetary transmission section which has a second internal gear, a second planet carrier, in particular with a second set of planet gears which are rotatably mounted on the second planet carrier, and a second sun gear as shafts. The shafts may be formed as rotating or static shafts. A first shaft of the second planetary transmission section is operatively connected and may be rotationally fixedly connected to the first input interface. A second shaft of the second planetary transmission section is operatively connected and may be rotationally fixedly connected to the second input interface.

The main axes of the first and of the second planetary transmission section and/or axes of rotation of the sun gears of the first and of the second planetary transmission section are arranged so as to be parallel and offset with respect to one another.

The transmission arrangement furthermore has a first speed ratio transmission section, which provides at least one first speed ratio stage. The first speed ratio transmission section may provide two, three or more speed ratio stages. The speed ratio may be any desired speed ratio; in particular, it is also possible for a speed reduction to be implemented by means of the speed ratio transmission section. A third shaft of the first planetary transmission section is operatively connected to an input of the first speed ratio transmission section. The third shaft of the first planetary transmission section may be rotationally fixedly connected to the input of the first speed ratio transmission section.

Furthermore, the transmission arrangement has a second speed ratio transmission section. The second speed ratio transmission section has at least one second speed ratio stage, and may have a multiplicity of second speed ratio stages. The third shaft of the second planetary transmission section is operatively connected, in particular rotationally fixedly connected, to an input of the second speed ratio transmission section.

Furthermore, the transmission arrangement has an output interface. The outputs of the speed ratio transmission sections are operatively connected to the output interface.

It is thus possible for a traction torque to be conducted into the transmission arrangement via the input interfaces and to be conducted out via the output interface. For example, the output interface may be adjoined by an output transmission stage, in particular a final drive, and/or a differential device for distributing the transmitted traction torque to axles of the vehicle or to wheels of a driven axle. The output transmission stage and/or the differential device optionally form a part of the transmission arrangement.

In the context of the disclosure, it is proposed that the transmission arrangement has a coupling section for the coupling of the second shafts of the planetary transmission sections. The second shafts are in particular supported against one another via the coupling section in at least one operating mode.

Here, it is a consideration of the disclosure that advantageous operating modes can be set in the transmission arrangement if the second shafts act counter to one another in at least one operating mode. In this way, a deceleration and/or braking torque is introduced into the second shafts owing to the mutual support. Examples of such advantageous operating modes will be discussed in more detail below.

It may be provided that the coupling section is formed and/or arranged such that, in the case of a co-directional torque at the first shafts of the two planetary transmission sections and a co-directional torque at the third shafts of the planetary transmission sections, the torques at the second shafts act in opposite directions. The mutual support is realized as a result of the action in opposite directions. Alternatively, opposite torques prevail at the first shafts and opposite torques prevail at the third shafts and opposite torques prevail at the second shafts.

In one possible design embodiment of the disclosure, the coupling section is formed as a transmission section with a negative speed ratio. As a result of the negative speed ratio, a direction of rotation reversal occurs in the transmission section, such that the second shafts can be supported against one another in the at least one operating mode.

In principle, it may be provided that a deceleration torque and/or a braking torque is applied to at least one of the second shafts by means of the electric motor, which likewise acts on the second shafts via the second input interface. The transmission arrangement may have a coupling brake device. The coupling brake device acts on the coupling section. In particular, the coupling brake device decelerates at least one of the second shafts or both second shafts in relation to a frame or a housing of the transmission arrangement. In this way, it is possible for the coupling section to be set into a rigid state and/or blocked, such that the second shafts cannot be rotated relative to one another.

In one possible embodiment of the disclosure, it is provided that the coupling brake device acts on the second input interface. In particular, the brake device is rotationally fixedly connected to a brake side of the second input interface.

In an alternative embodiment of the disclosure, it is provided that the coupling brake device acts on the second shaft of the first and/or of the second planetary transmission section. By virtue of the fact that the second shafts of the first and of the second planetary transmission sections are coupled to one another via the coupling section, it is sufficient for only one of the second shafts to be braked.

In an example design embodiment of the disclosure, the first shaft of the first planetary transmission section is formed as the first internal gear, the second shaft of the first planetary transmission section is formed as the first sun gear, the third shaft of the first planetary transmission section is formed as the first planet carrier. Alternatively or in addition, the first shaft of the second planetary transmission section is formed as the second internal gear, the second shaft of the second planetary transmission section is formed as the second sun gear, and the third shaft of the second planetary transmission section is formed as the second planet carrier. In this embodiment, it is firstly necessary for the fixed-carrier speed ratios of the planetary transmission sections to be set in accordance with the application, and it is secondly the case that a compact construction is possible.

In an example embodiment, the transmission arrangement has at least or exactly one output-side coupling actuator apparatus, which includes the coupling brake device. Inputs of the output-side coupling actuator apparatus are operatively connected, in particular rotationally fixedly connected, to the second and to the third shaft of one of the planetary transmission sections, that is to say the first or the second planetary transmission section. The output-side coupling actuator apparatus is designed to rotationally fix the second and the third shaft to one another, such that these can rotate conjointly if appropriate. In an alternative shift state, the output-side coupling actuator apparatus is designed to rotationally fix the second shaft with respect to a frame and in particular a housing of the transmission arrangement and thus form the coupling brake device. Further operating modes of the transmission arrangement can be set by means of the output-side coupling actuator apparatus.

Alternatively or in addition, the transmission arrangement has at least one input actuator apparatus. The input actuator apparatus is arranged between the first input interface and the first shaft of one of the planetary transmission sections. The transmission arrangement optionally has two input actuator apparatuses, such that an input actuator apparatus is connected upstream of each of the first shafts. The input actuator apparatus is designed to rotationally fix the first input interface to the first shaft, and alternatively rotationally fix the first shaft with respect to a frame.

Both the output-side coupling actuator apparatus and the input actuator apparatus may also, as optional operating states, assume a neutral state. The inputs of the coupling actuator apparatus and of the input actuator apparatus are shifted independently of one another.

A further possible embodiment of the disclosure relates to a transmission arrangement which has an input actuator apparatus upstream of one of the planetary transmission sections and a clutch device upstream of the other planetary transmission section. This transmission arrangement furthermore includes first and second input-side coupling actuator apparatuses. The first input-side coupling actuator apparatus has the first shaft and the second shaft of the first planetary transmission section as inputs. In a first shift state, the first and the second shaft are rotationally fixable to one another. In a second shift state, the second shaft runs freely, and the first shaft is rotationally fixedly coupled to a frame, in particular to a housing of the transmission arrangement. Furthermore, the first input-side coupling actuator apparatus can assume a neutral state, wherein both shafts and/or inputs run freely. The second input-side coupling actuator apparatus has the first shaft and the second shaft of the second planetary transmission section as inputs. In a first shift state, the first and the second shaft are rotationally fixable to one another. In a second shift state, the first shaft runs freely, and the second shaft is rotationally fixedly coupled to a frame, in particular to a housing of the transmission arrangement. Furthermore, the second input-side coupling actuator apparatus can assume a neutral state, wherein both shafts and/or inputs run freely.

A further possible subject matter relates to a vehicle having the transmission arrangement as described above.

BRIEF DESCRIPTION OF THE DRAWINGS

Further features, advantages and effects of the disclosure will emerge from the following description of exemplary embodiments of the disclosure and from the appended figures. In the figures:

FIG. 5 shows a further transmission arrangement as a further exemplary embodiment of the disclosure;

FIGS. 6a, 6b, and 6c show a first possible physical realization of the transmission arrangement;

FIGS. 7a, and 7b show a second possible physical realization of the transmission arrangement;

FIGS. 9-13 show diagrams with respect to time for the explanation of shift processes of the transmission arrangement.

DETAILED DESCRIPTION

Figure 1:
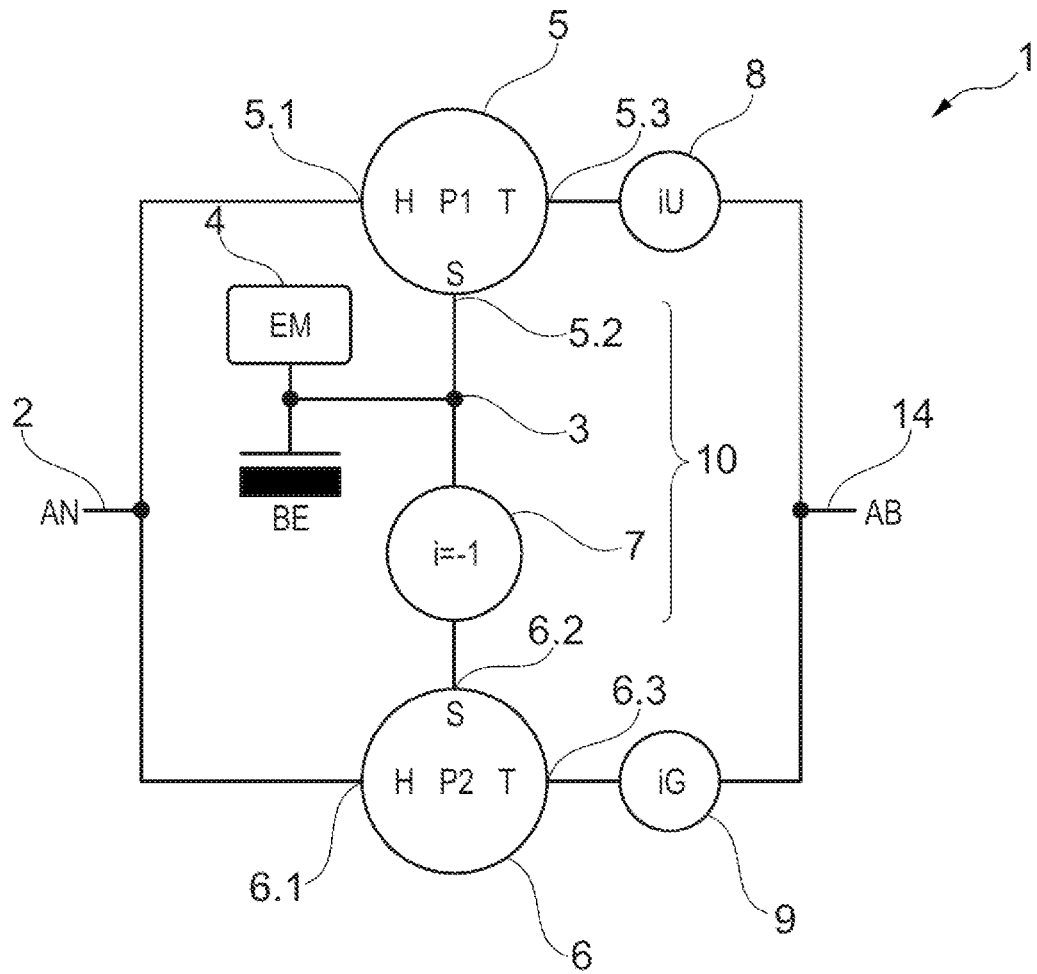
FIG. 1 shows a transmission arrangement as an exemplary embodiment of the disclosure.

FIG. 1 shows, in a schematic diagrammatic illustration, a transmission arrangement 1 as a first exemplary embodiment of the disclosure. The transmission arrangement 1 has a first input interface 2 (AN) for the coupling of an internal combustion engine (not illustrated), and a second input interface 3 for the coupling of an electric motor 4.

The transmission arrangement 1 furthermore has a first planetary transmission section 5 and a second transmission section 6 (P1/P2). The first transmission section 5 has an internal gear 5.1 as a first shaft, a sun gear 5.2 as a second shaft and a planet carrier 5.3 as a third shaft. On the planet carrier 5.3, there are rotatably arranged planet gears, which mesh with the internal gear 5.1 and with the sun gear 5.2.

Similarly, the second planetary transmission section 6 has an internal gear 6.1 as a first shaft, a sun gear 6.2 as a second shaft and a planet carrier 6.3 as a third shaft. On the planet carrier 6.3, there are seated planet gears, which mesh with the internal gear 6.1 and with the sun gear 6.2.

The internal gears 5.1, 6.1 are rotationally fixedly connected to the first input interface 2. The sun gears 5.2, 6.2 are operatively connected to the second input interface 3. The sun gear 5.2 is rotationally fixedly connected to the second input interface 3. The sun gear 6.2 is connected to the second input interface 3 via a transmission section 7. The transmission section 7 has a speed ratio of i=−1. The transmission section 7 forms a coupling section 10 between the sun gears 5.2, 6.2.

The transmission arrangement 1 furthermore has a first speed ratio transmission section 8 (iU) and a second speed ratio transmission section 9 (iG). Both speed ratio transmission sections 8, 9 have in each case at least one, and may have multiple, speed ratio stages. The inputs of the speed ratio transmission sections 8, 9 are in each case rotationally fixedly connected to the third shafts, in particular to the planet carrier 5.3 or 6.3 respectively. The outputs of the speed ratio transmission sections 8, 9 are in each case rotationally fixedly connected to the output interface 14 (AB).

Furthermore, the transmission arrangement 1 has a coupling brake device BE which is rotationally fixedly connected to the second input interface 3 and which allows the second input interface 3 to be blocked or braked.

In the transmission arrangement 1 as per FIG. 1, the planetary transmission sections 5, 6 are, by way of the sun gears 5.2 and 6.2, coupled via the coupling section 10 by means of the transmission section 7 with the speed ratio of i=−1, such that, during operation in which both speed ratio transmission sections 8, 9 drive the output interface 14, the planetary transmission sections 5, 6 are supported on one another via the coupling section 10. Alternatively, the support may also be realized by means of other transmission variants as a coupling section, for example by virtue of the connection of the planetary transmission sections 5, 6 to the first input interface 2 being realized by means of speed ratios with different signs, together with a different sign of the speed ratio between the planetary transmission sections 5, 6 and the output interface 14.

In particular, the transmission arrangement 1 has a transmission input shaft AN, which forms the first input interface 2, and a transmission output shaft AB, which forms the output interface 14, two speed ratio transmission sections 8, 9, which form two sub-transmissions with in each case one or more gear ratios, the electric motor 4, the coupling brake device BE, two planetary transmission sections 5, 6, and the coupling section 10 between the planetary transmission sections 5, 6.

An exemplary embodiment of the transmission arrangement 1 has a fixed-carrier speed ratio of the planetary transmission sections 5, 6 of i=−2.5, two transmission stages for the first speed ratio transmission section with i1=−2.3 and i3=−0.7, and two speed ratio stages for the second speed ratio transmission section 9 with i2=−1.1; i4=−0.51. The transmission arrangement 1 optionally additionally has a final drive speed ratio, in particular at a differential device (not illustrated), with iD=−3. The final drive speed ratio is positioned downstream of the output interface 14.

Possible operating modes of the transmission arrangement 1 and the resulting speed ratios are presented in the following table:

| Gear ratio | $i_{AN->AB}$ | $i_{EM->AB}$ | BE | iU | iG |
|---|---|---|---|---|---|
| G1 => I1 | 9.66 | Blocked | Active | −2.3 | N |
| V1 | 9.66 | 24.15 | — | −2.3 | N |
| G2 => I1 + I2 | 7.14 | 6.3 | — | −2.3 | −1.1 |
| V2 | 4.62 | −11.6 | — | N | −1.1 |
| G3 => I2 | 4.62 | Blocked | Active | N | −1.1 |
| V2 | 4.62 | −11.6 | — | N | −1.1 |
| G4 => I2 + I3 | 3.78 | −2.1 | — | −0.7 | −1.1 |
| V3 | 2.94 | 7.35 | — | −0.7 | N |
| G5 => I3 | 2.94 | Blocked | Active | −0.7 | N |
| V3 | 2.94 | 7.35 | — | −0.7 | N |
| G6 => I3 + I4 | 2.54 | 1 | — | −0.7 | −0.51 |
| V4 | 2.14 | −5.36 | — | N | −0.51 |
| G7 => I4 | 2.14 | Blocked | Active | N | −0.51 |

Brief Description of the Operating Modes

G1, G3, G5, G7: Operating modes with fixed rotational speed ratios. In each case only one speed ratio transmission section (8 or 9) has an engaged gear ratio and is involved in the transmission of torque. The coupling section 10 is static.

G2, G4, G6: Operating modes with fixed rotational speed ratios. Both speed ratio transmission sections (8 and 9) simultaneously have an engaged gear ratio and are involved in the transmission of torque. The resulting speed ratio lies between G1 and G3. The rotational speed of the coupled sun gears 5.2, 6.2 is set of its own accord such that, despite different rotational speeds at the planetary transmission sections 5, 6, the internal gears 5.1, 6.1 rotate at equal speed with the rotational speed of the first input interface 2.

Operating modes V1, V2, V3 and V4: These are each driving modes in which the rotational speed of the electric motor 4 and of the internal combustion engine (not illustrated) are superposed (are added) in one of the planetary transmission sections 5, 6. thus, in the case of constant rotational speed of the internal combustion engine, the output rotational speed can be varied by means of the rotational speed of the electric motor. This makes it possible for the output interface to be static when a gear ratio is engaged and the internal combustion engine is rotating.

In the above table, the speed ratios $I_{VM \to AB}$ and $I_{EM \to AB}$ relate to the speed ratios of the torques:

$$AB_{torque} = AN_{torque} * i_{VM \to AB}$$

Figure 2:
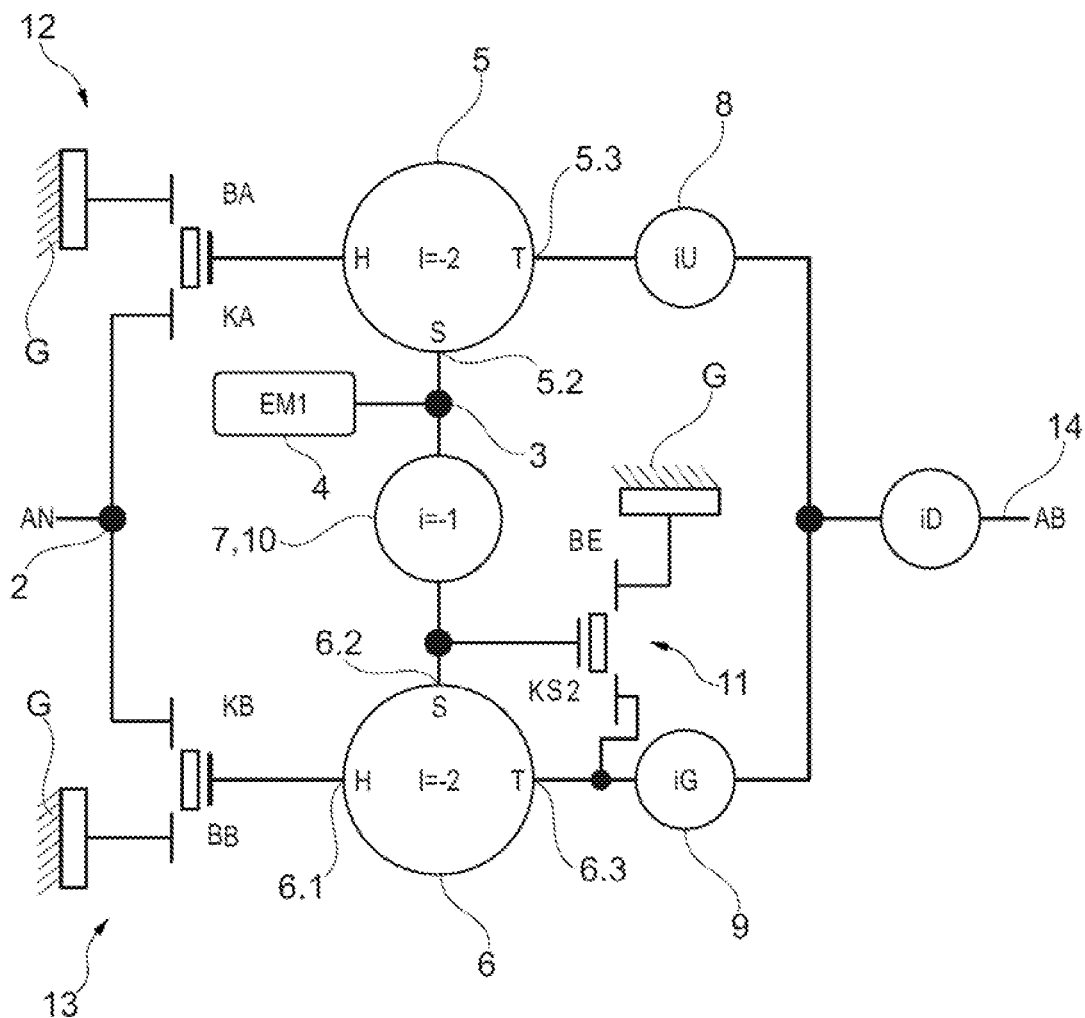
FIG. 2 shows a further transmission arrangement as a further exemplary embodiment of the disclosure.

FIG. 2 shows, in a similar illustration to FIG. 1, a transmission arrangement 1, which differs from the transmission arrangement 1 in FIG. 1 firstly by the position of the coupling brake device BE and secondly by further components. Similarly to the situation in FIG. 1, however, the transmission arrangement 1 includes the first input interface 2, the second input interface 3, the electric motor 4, the output interface 14, the first and second planetary transmission section 5, 6 and the first and second speed ratio transmission section 8, 9. In this exemplary embodiment, too, the sun gears 5.2, 6.2 are connected to one another by means of a coupling section 10, which includes the transmission section 7. However, the coupling brake device BE forms a part of an output-side coupling actuator apparatus 11, which has two inputs. A first input is rotationally fixedly connected to the sun gear 6.2, and a second input is rotationally fixedly connected to the planet carrier 6.3. The output-side coupling actuator apparatus 11 makes it possible, in a shift position BE, for the sun gear 6.2 to be rotationally fixed with respect to a frame, in particular a housing of the transmission arrangement 1. In a shift position KS2, the sun gear 6.2 and the planet carrier 6.3 are rotationally fixed to one another. The output-side coupling actuator apparatus 11 may, like all other devices of the transmission arrangement 1, be actuated by means of a control device (not illustrated). It is furthermore possible for the output-side coupling actuator apparatus 11 to be set into a neutral state N. In this case, the inputs are rotationally decoupled with respect to one another and with respect to the frame G. The shift position KS2 permits blocking of the planetary transmission section 6, such that the internal gear 6.1, sun gear 6.2 and planet carrier 6.3 can rotate synchronously with one another. BE serves for the blocking of the coupled inputs of the two planetary transmission sections 5, 6 against rotation, and thus forms the coupling brake device. KS2 is combined with the locking means BE as one shift element. If only one of the planetary transmission sections 5, 6 is designed to be lockable, as illustrated in FIG. 2, then it is particularly advantageous if the lockable planetary transmission section 6 is situated upstream of the speed ratio transmission section 8, 9 with the fastest speed ratio, such that an economy gear ratio using the locking of the planetary transmission section 6 once again permits a considerably faster speed ratio. It is furthermore advantageous if the lockable planetary transmission section 6 is not situated upstream of the sub-transmission with the slowest speed ratio, because this simplifies the realization of a creep gear ratio.

The transmission arrangement 1 furthermore has two input actuator apparatuses 12, 13. The input actuator apparatuses 12, 13 are arranged in each case between the first input interface 2 and the first shaft, in this case the internal gear 5.1 and 6.1 of the planetary transmission sections 5, 6. The input actuator apparatuses 12, 13 make it possible for the respective internal gear 5.1, 6.1 to be selectively rotationally fixed to the first input interface 2 or to the frame G. In the case of the input actuator apparatuses 12, 13, too, a neutral position N is possible.

The shift positions KA and KB permit a connection between the internal gears 5.1 and 6.1 of the planetary transmission sections 5, 6 and the first input interface 2. BA and BB permit blocking of the corresponding internal gear 5.1, 6.1 against rotation.

Exemplary speed ratios are:

fixed-carrier speed ratio of the planetary transmission sections 5, 6: i=−2.5; speed ratios of the spur-gear stages of the first speed ratio transmission section 5: i1=−2.3; i3=−0.7 and of the second speed ratio transmission section 6: i2=−1.1; i4=−0.51. Final drive speed ratio at the differential: iD=−3.

The various operating modes are specified in the following table.

|  | Mode | Comment | $i_{AN \to AB}$ | $i_{EM \to AB}$ | KA/BA | KB/BB | BE/KS2 | iU | iG |
|---|---|---|---|---|---|---|---|---|---|
| Fixed | G1 | iU = I1 + creep | 16.1 | −16.1 | KA | KB | KS2 | −2.3 | N |
| speed | G2 | iU = I1 | 9.66 | Blocked | KA | KB | BE | −2.3 | N |
| ratios | G3 | iU = I1 + iG = I2 | 7.14 | 6.3 | KA | KB | N | −2.3 | −1.1 |
|  | G4 | iG = I2 | 4.62 | Blocked | KA | KB | BE | N | −1.1 |
|  | G5 | iU = I3 + iG = I2 | 3.78 | −2.1 | KA | KB | N | −0.7 | −1.1 |
|  | G6 | iU = I3 | 2.94 | Blocked | KA | KB | BE | −0.7 | N |
|  | G7 | iU = I3 + iG = I4 | 2.54 | 1 | KA | KB | N | −0.7 | −0.5 |
|  | G8 | iG = I4 | 2.14 | Blocked | KA | KB | BE | N | −0.5 |
|  | G9 | iG = I4 + economy | 1.53 | −1.53 | KA | KB | KS2 | N | −0.5 |
| Electric | E1 | Electric forward | Idle | −11.6 | KA | BB | N | N | −1.1 |
| Driving | E1H | E1 auxiliary gear ratio | 14.28 | −11.6 | KA | BB | N | −2.3 | −1.1 |
|  | E1V1 | V1 proceeding from E1H | 9.66 | 24.15 | KA | N | N | −2.3 | −1.1 |
|  | E1G1 | V1 proceeding from E1V1 | 9.66 | Blocked | KA | N | BE | −2.3 | −1.1 |
|  | E1V1 | V1 proceeding from E1G1 | 9.66 | 24.15 | KA | N | N | −2.3 | −1.1 |
| R | ER | Electric reverse | Idle | 24.15 | BA | N | KS2 | −2.3 | N |
|  | R | Reverse | −24.15 | −24.15 | BA | KB | KS2 | −2.3 | N |
| Variable | V1 | iU = I1 | 9.66 | 24.15 | KA | KB | N | −2.3 | N |
|  | V2 | iG = I2 | 4.62 | −11.6 | KA | KB | N | N | −1.1 |
|  | V3 | iU = I3 | 2.94 | 7.35 | KA | KB | N | −0.7 | N |
|  | V4 | iG = I4 | 2.14 | −5.36 | KA | KB | N | N | −0.5 |
|  | L | Charging gear ratio | Idle | Idle | N | KB | KS2 | N | N |

The fixed gear ratios G2-G8 correspond to the fixed gear ratios G1-G7 from FIG. 1. The operating modes V1-V4 are similar to those in FIG. 1; the additional shift elements KA/BA, KB/BB and KS2 permit 2 new gear ratios (G1=>I1+creep and G9=>I4+economy), and a reverse gear ratio, and also electric driving (forward and reverse). For electric forward driving and a change to hybrid operation without an interruption in traction power and without special synchronizing rings on the individual shift sleeves, further shift combinations are listed. These will be discussed further below. A change of the gear ratios or driving modes without an interruption in traction power is also possible without friction elements for an overlapping shift of the shift elements.

Figure 3:
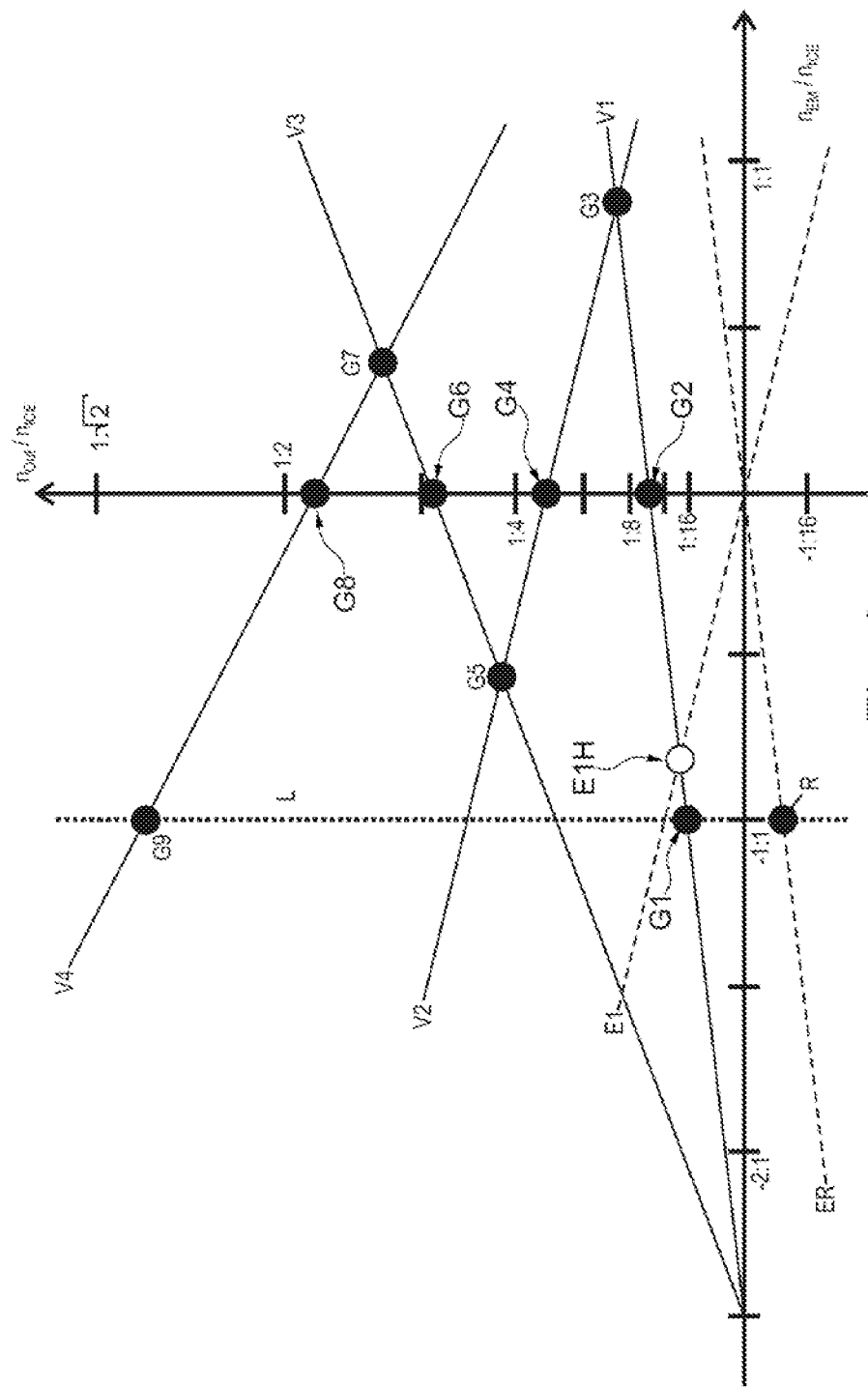
FIG. 3 is an illustration for the explanation of different driving states.

FIG. 3 shows an overview of the rotational speed states of certain operating modes.

The figure illustrates what speed ratios (Y-axis, non-linear scale) are exhibited by the operating modes with fixed rotational speed ratios (G1 to G9, EH and R). The figure also illustrates what rotational speed ratio the electric motor exhibits relative to the internal combustion engine (X axis, non-linear scale) in said operating modes. The individual operating modes that are used in the case of drive via AN are plotted as black dots, supplemented by the designation of the operating mode. Further operating modes, which are used for the switch from purely electric drive to hybrid drive or drive via AN are illustrated as white dots with a black edge.

The vertical dotted line "L" corresponds to an operating mode "starter/generator", in which AN and EM are coupled to one another independently of AB.

The dashed diagonal lines (E1 and ER) correspond to the rotational speed ratios in the purely electric driving modes (E and RE). Since, in these modes, AN or the internal combustion engine can rotate or be static independently of EM and AB, it is assumed for the illustration of the X axis that the internal combustion engine rotates at a constant rotational speed>0, which corresponds to the rotational speed of the internal combustion engine in the fixed gear ratios E1H and R respectively.

The solid diagonal lines (V1 to V4) in the diagram symbolize the rotational speed interaction of electric motor, internal combustion engine and transmission output in transmission states or operating modes in which, by means of the planetary gear sets, the rotational speed of the internal combustion engine (AN) and the rotational speed of the electric machine (EM) are added/superposed and thus jointly defined the output rotational speed (AB).

Figure 4:
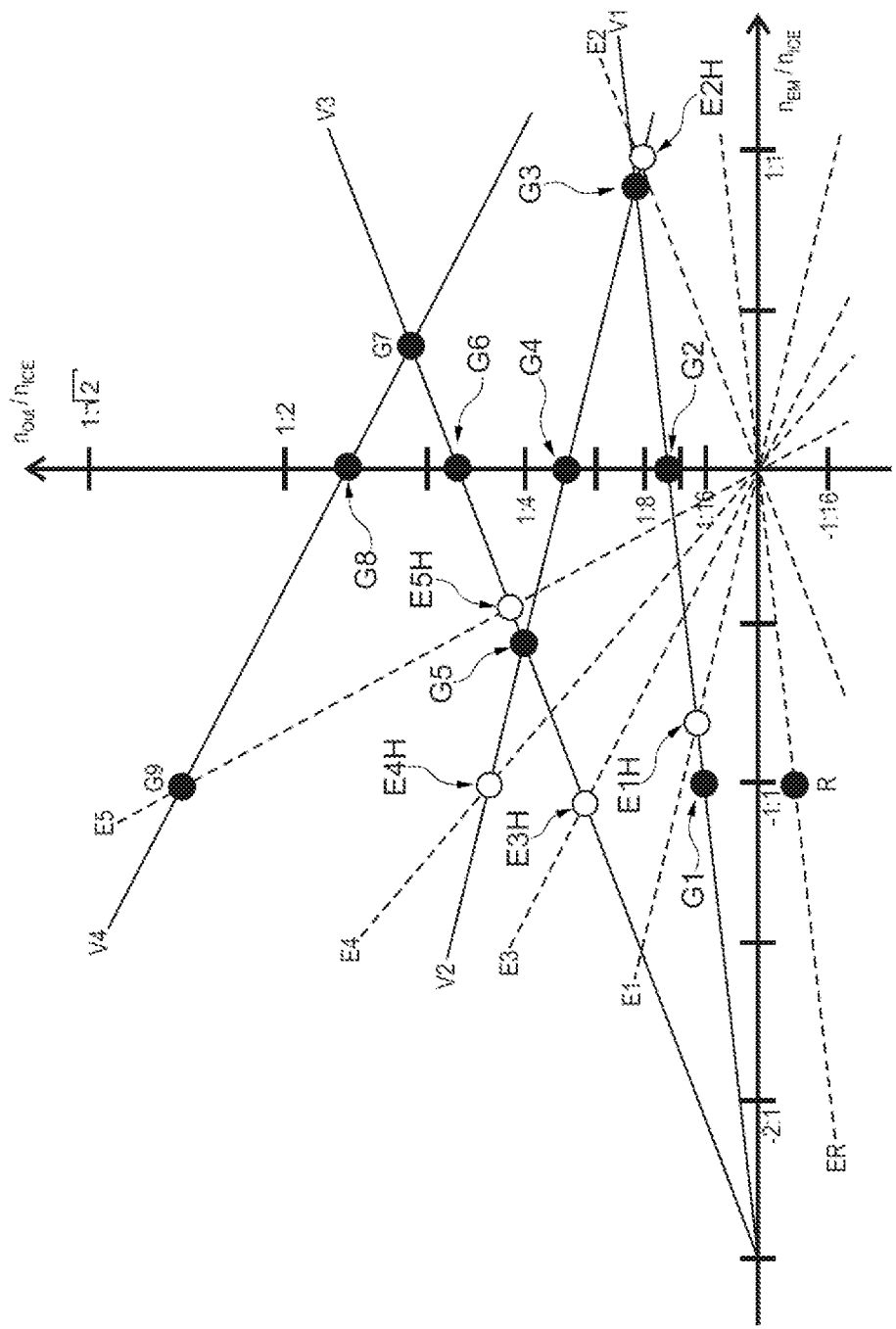
FIG. 4 is a further illustration for the explanation of different driving states.

In FIG. 4, further rotational speed states are added and further operating modes are illustrated. Here, the diagram from FIG. 3 has been supplemented to include further operating modes. The additions relate to modes for purely electric driving and further modes for the switch from purely electric drive to hybrid or drive via AN.

For the sake of clarity, it is also the case in this diagram that not all possible combinations have been plotted.

| Gear ratio | $i_{AN->AB}$ | $i_{EM->AB}$ | Active elements |
|---|---|---|---|
| G1 | 16.1 | 16.1 | KA KB KS2 IU = −2.3 IG = N |
| G2 | 9.66 | Blocked | KA BE IU = −2.3 IG = −1.1 |
| G3 | 7.14 | −6.3 | KA KB IU = −2.3 IG = −1.1 |
| G4 | 4.62 | Blocked | KA KB BE IU = N IG = −1.1 |
| G5 | 3.78 | 2.1 | KA KB IU = −0.7 IG = −1.1 |
| G6 | 2.94 | Blocked | KA KB BE IU = −0.7 IG = N |
| G7 | 2.54 | −1 | KA KB IU = −0.7 IG = −0.51 |
| G8 | 2.14 | Blocked | KA KB BE IU = N IG = −0.51 |
| G9 | 1.53 | 1.53 | KA KB KS2 IU = N IG = −0.51 |
| V1 | 9.66 | −24.1 | KA KB IU = −2.3 IG = N' |
| V2 | 4.62 | 11.55 | KA KB IU = N IG = −1.1' |
| V3 | 2.94 | −7.35 | KA KB IU = −0.7 IG = N' |
| V4 | 2.14 | 5.36 | KA KB IU = N IG = −0.51' |

-continued

| Gear ratio | $i_{AN->AB}$ | $i_{EM->AB}$ | Active elements |
|---|---|---|---|
| E1 | Idle | 11.55 | BB IU = N IG = −1.1' |
| E1H | 14.28 | 11.55 | KA BB IU = −2.3 IG = −1.1 |
| E2 | Idle | −7.35 | KB BA IU = −0.7 IG = N' |
| E2H | 7.56 | −7.35 | KB BA IU = −0.7 IG = −1.1 |
| E3 | Idle | 5.36 | KA BB IU = N IG = −0.51' |
| E3H | 5.08 | 5.36 | KA BB IU = −0.7 IG = −0.51 |
| E4 | Idle | 3.3 | KA KS2 IU = N IG = −1.1' |
| E4H | 3.3 | 3.3 | KA KB KS2 IU = N IG = −1.1 |
| E5 | Idle | 1.53 | KA KS2 IU = N IG = −0.51' |
| E5H | 3.55 | 1.53 | KA KS2 IU = −0.7 IG = −0.51 |
| ER | Idle | −24.1 | BA KS2 IU = −2.3 IG = N' |
| R | −24.1 | −24.1 | BA KB KS2 IU = −2.3 IG = N' |

If comfort and traction power interruption play a secondary role during the shift, the transmission arrangement as per FIG. 2 permits a multiplicity of further shift combinations, which result in 20 forward gear ratios and two reverse gear ratios with fixed speed ratios. A list of the gear ratios with the speed ratios and active shift elements is given below. The shift states are merely examples, because individual gear ratios may be realized by means of different shift combinations.

| Gear ratio | $i_{AN->AB}$ | $i_{EM->AB}$ | Active elements |
|---|---|---|---|
| A1 | 16.1 | 16.1 | KA KB KS2 K1 |
| A2 | 14.28 | −24.1 | KB BA K1 K2 |
| A3 | 11.8 | 5.36 | KA BB K1 K4 |
| A4 | 10.98 | 3.3 | KA KS2 K1 K2 |
| A5 | 10.27 | 1.53 | KA KS2 K1 K4 |
| A6 | 9.66 | Blocked | KA BB BE K1 |
| A7 | 7.56 | −7.35 | KB BA K3 K2 |
| A8 | 7.14 | −6.3 | KA KB K1 K2 |
| A9 | 5.9 | −9.4 | KA KB K1 K4 |
| A10 | 5.08 | −7.35 | KB BA K3 K4 |
| A11 | 4.9 | 4.9 | KA KB KS2 K3 |
| A12 | 4.62 | Blocked | KB BA BE K2 |
| A13 | 4.26 | 3.3 | KA KS2 K3 K2 |
| A14 | 3.78 | 2.1 | KA KB K3 K2 |
| A15 | 3.55 | 1.53 | KA KS2 K3 K4 |
| A16 | 3.3 | 3.3 | KB BA KS2 K2 |
| A17 | 2.94 | Blocked | KA BB BE KS2 K3 |
| A18 | 2.54 | −1 | KA KB K3 K4 |
| A19 | 2.14 | Blocked | KA KB BE K4 |
| A20 | 1.53 | 1.53 | KB KS2 K3 K4 |
| R | −7.35 | −7.35 | KB BA KS2 K3 |
| R | −24.1 | −24.1 | KB BA KS2 K1 |

In general, the shift elements may be of positively locking design with or without synchronizing rings. The decision as regards the design may be made individually for each shift element. In the situation without synchronizing rings, the synchronization of the shift toothing is realized through control of the rotational speed of the electric machine and/or of the internal combustion engine that drives the shaft AN. Even in the case of positively locking shift elements with synchronizing rings being used, the major part of the synchronization is realized through control of the rotational speeds, but the shift time can be shortened, because the rotational speeds do not need to be controlled with such accuracy. It is alternatively also possible for individual shift elements to be of non-positively locking design, such that the shift times can be shortened yet further. With suitable selection of the shift elements that are of non-positively locking design, it is even possible for the electric machine to be omitted, or for the transmission to continue to be operated even in the case of a defective electric machine (emergency running strategy). For an emergency running strategy in the case of an embodiment as per the sketch on the right, it is particularly advantageous if BE, KA and KB are of non-positively locking design. A non-positively locking BA would additionally permit launching in a reverse direction. A non-positively locking KS2 furthermore makes it possible to utilize the economy gear ratio and the creep gear ratio without an electric machine.

Figure 5:
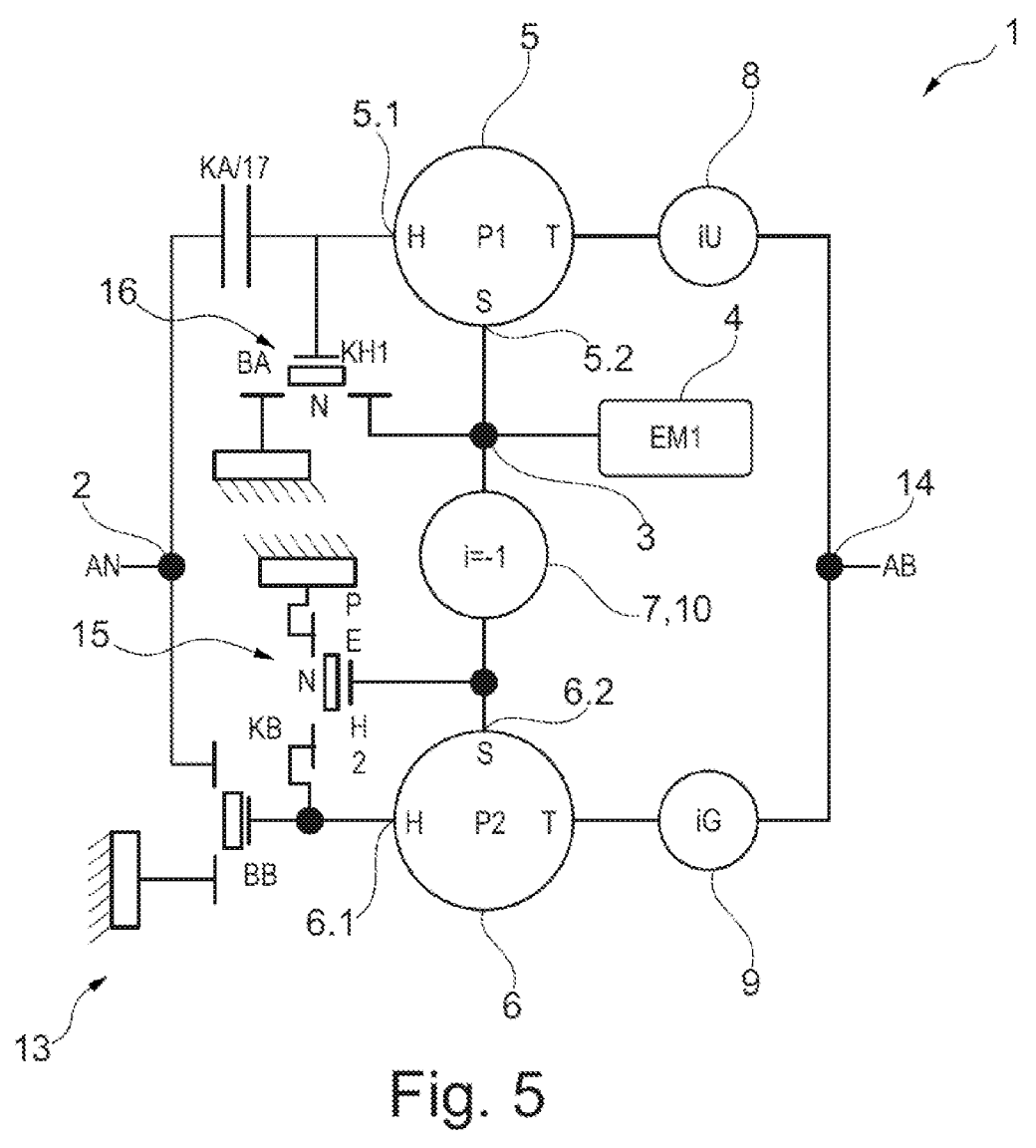

FIG. 5 shows a further exemplary embodiment of the transmission arrangement 1, which differs from the transmission arrangement 1 in FIG. 1 firstly by the position of the coupling brake device BE and secondly by further components. Similarly to the situation in FIG. 1, however, the transmission arrangement 1 includes the first input interface 2, the second input interface 3, the electric motor 4, the output interface 14, the first and second planetary transmission section 5, 6 and the first and second speed ratio transmission section 8, 9. In this exemplary embodiment, too, the sun gears 5.2, 6.2 are connected to one another by means of a coupling section 10, which includes the transmission section 7.

However, the coupling brake device BE forms a part of an input-side, first coupling actuator apparatus 15, which has two inputs. The first input is rotationally fixedly connected to the sun gear 6.2 of the second planetary transmission section 6, and the second input is rotationally fixedly connected to the internal gear 6.1. In the shift position BE, the sun gear 6.2 is rotationally fixedly connected to the frame G, and in the shift position KH2, the sun gear 6.2 is rotationally fixedly connected to the internal gear 6.1. A neutral position is also possible. A second input-side coupling actuator apparatus 16 is arranged upstream of the second planetary transmission section 5 and has two inputs, wherein one input is rotationally fixedly coupled to the internal gear 5.1 and the other input is rotationally fixedly coupled to the sun gear 5.2. In a shift state KH1, the internal gear 5.1 is rotationally fixedly coupled to the sun gear 5.2. In a shift state BA, the internal gear 5.2 is rotationally fixedly coupled to the frame G. A neutral shift state N is also possible.

The transmission arrangement 1 furthermore has the input actuator apparatus 13, wherein reference is made to the description of FIG. 2. As an additional component, the transmission arrangement 1 has a clutch apparatus 17, which is arranged between the first input interface 2 and the second input-side coupling actuator apparatus 16.

FIG. 5 shows, in particular, a variant in which both planetary gear sets are lockable (by means of KH2 and KH1). This is advantageous if the sub-transmissions iU and iG have, in sum total, an odd number of gear ratios. In the case of an odd number of gear ratios, the fastest and the slowest speed ratio are situated in the same sub-transmission, such that, with only one planetary gear set of lockable design, either the economy gear ratio or the creep gear ratio can be realized to a limited extent. The coupling between the planetary gear set P1 and the transmission input shaft is designed as a frictionally locking clutch. This makes it possible to start the internal combustion engine during purely electric driving by closing the clutch KA.

FIG. 6a shows an exemplary physical embodiment of the transmission arrangement shown in FIG. 2. The internal combustion engine drives the drive shaft "AN" directly or indirectly via a vibration damper (the vibration damper is not illustrated in the diagram). "AN" meshes, via the toothed gear ZAN, with the toothed gears ZX1, ZX2, which are arranged concentrically with respect to "X1" and "X2" respectively. The shift sleeves (BA/KA and BB/KB) make it possible for the shafts X1 and X2 to be selectively locked against rotation or rotationally fixedly connected to the toothed gears ZX1 and ZX2 respectively.

Sub-transmissions iU, iG and spur-gear stages I1, I2, I3, I4: The sub-transmission iU includes the spur-gear stages I1 and I3, and the hollow shaft XiU. The sub-transmission iG includes the spur-gear stages I2 and I4, and the hollow shaft XiG. The output toothed gears of the speed ratios I1 to I4 are arranged rotationally fixedly on the output shaft AB. The drive toothed gears of the speed ratios I1 to I4 are in each case arranged concentrically with respect to the hollow shafts XiU and XiG respectively, and can in each case be rotationally fixedly connected to XiU and XiG respectively by means of the shift sleeves K1/K3 and K2/K4 respectively. The hollow shafts XiU and XiG are arranged concentrically with respect to the shafts X1 and X2 and are driven by the planet carriers of the planetary gear sets P1 and P2.

Planetary gear sets P1 and P2: The internal gears of the planetary gear sets P1 and P2 are in each case driven by the shafts X1 and X2 respectively. The sun gears are in each case rotationally fixedly connected to the toothed gears ZS1 and ZS2 respectively. ZS1 and ZS2 mesh with one another such that they rotate in opposite directions of rotation. The electric machine EM is connected by means of a toothed gear ZEM selectively to ZS1 or ZS2, wherein, in the appended diagram, ZEM is meshing with ZS2. Further gear ratios: If more than the 9 gear ratios (for example for a finer gear ratio stepping) are required, the shafts XiG and XiU can be extended to the "right" and supplemented to include further spur-gear stages.

Spatial arrangement of the shafts (viewed in a longitudinal direction): AN, X1 and X2 form a triangle and X1, X2 and AB form a triangle. Said triangles may be arranged adjacent to one another (FIG. 6b) or so as to overlap (FIG. 6c). In both cases, the triangles have one common edge. The other edges may have different lengths.

FIGS. 7a and 7b show a refinement of the transmission arrangement 1 in FIGS. 6a, b, c. If the shafts are arranged in space such that the shafts AN-X1-X2 and AB-X1-X2 are congruent, then a further gear ratio can be realized by means of a further shift apparatus "KD". In FIG. 7a, the shift apparatus "KD" has been combined with a parking lock "PS".

Figure 8B:
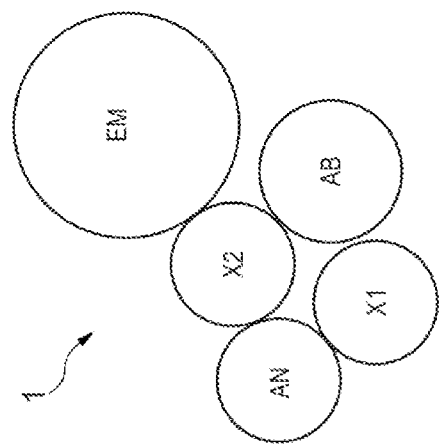
FIGS. 8a, and 8b show a third possible physical realization of the transmission arrangement.
Figure 8A:
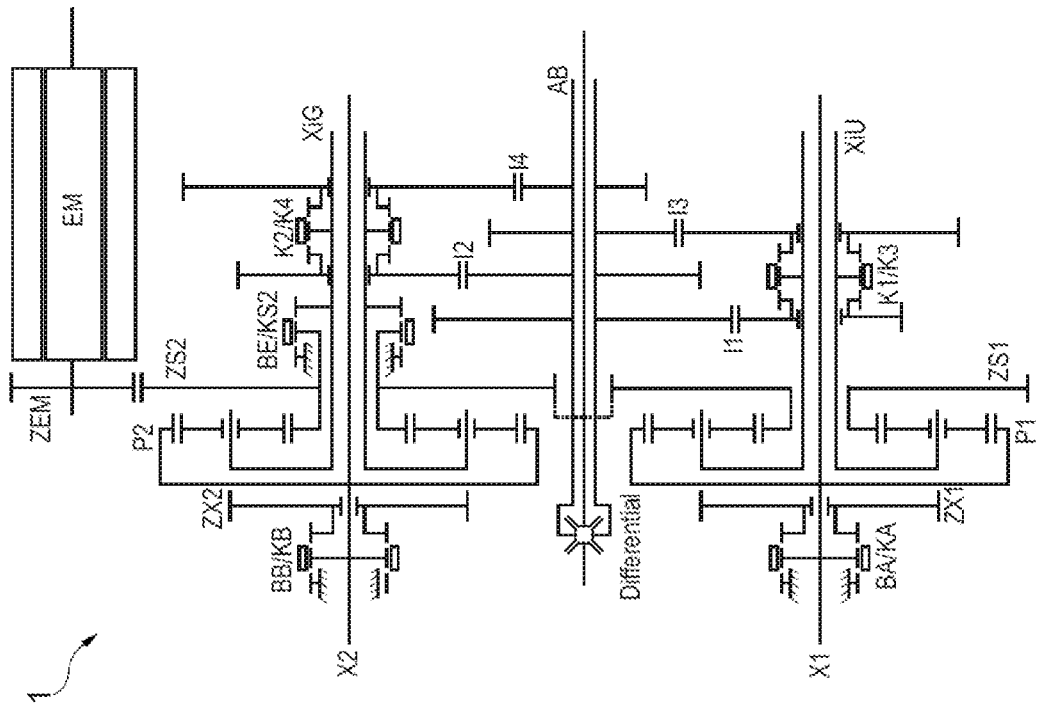

FIGS. 8a and 8b show a refinement of the transmission arrangement 1 in the preceding Figures. If the shafts are arranged in space such that the triangles composed of the shafts AN-X1-X2 and AB-X1-X2 are arranged adjacent to one another, the differential can also be integrated into the output shaft AB.

Here, the differential may be arranged to the left-hand side of the spur-gear stages (as illustrated in the diagram) or to the right-hand side of the spur-gear stages I1 to I4.

In the case of an arrangement of the differential to the right-hand side, the internal combustion engine may also be arranged to the right-hand side, with a long transmission input shaft. In this case, the transmission input shaft would extend through the entire transmission, and the planetary gear sets would then be not between the internal combustion engine and spur-gear stages but on that side of the spur-gear stages which is averted from the internal combustion engine. This is advantageous in the case of front-transverse applications, because the spur-gear stages and the differential can be arranged very close to the internal combustion engine. If, owing to the dimensions of the shift sleeves K1/K3 and K2/K4, the spacing between the spur-gear stages (e.g. I2 and I3) becomes too large, a narrow differential may also be arranged between the spur-gear stages.

Furthermore, a long input shaft of elastic design to the internal combustion engine can be used as an elasticity for a vibration absorber or dual-mass flywheel; for example, a dual-mass flywheel can be realized by virtue of a flywheel mass being arranged at both ends of the shaft.

Figure 9:
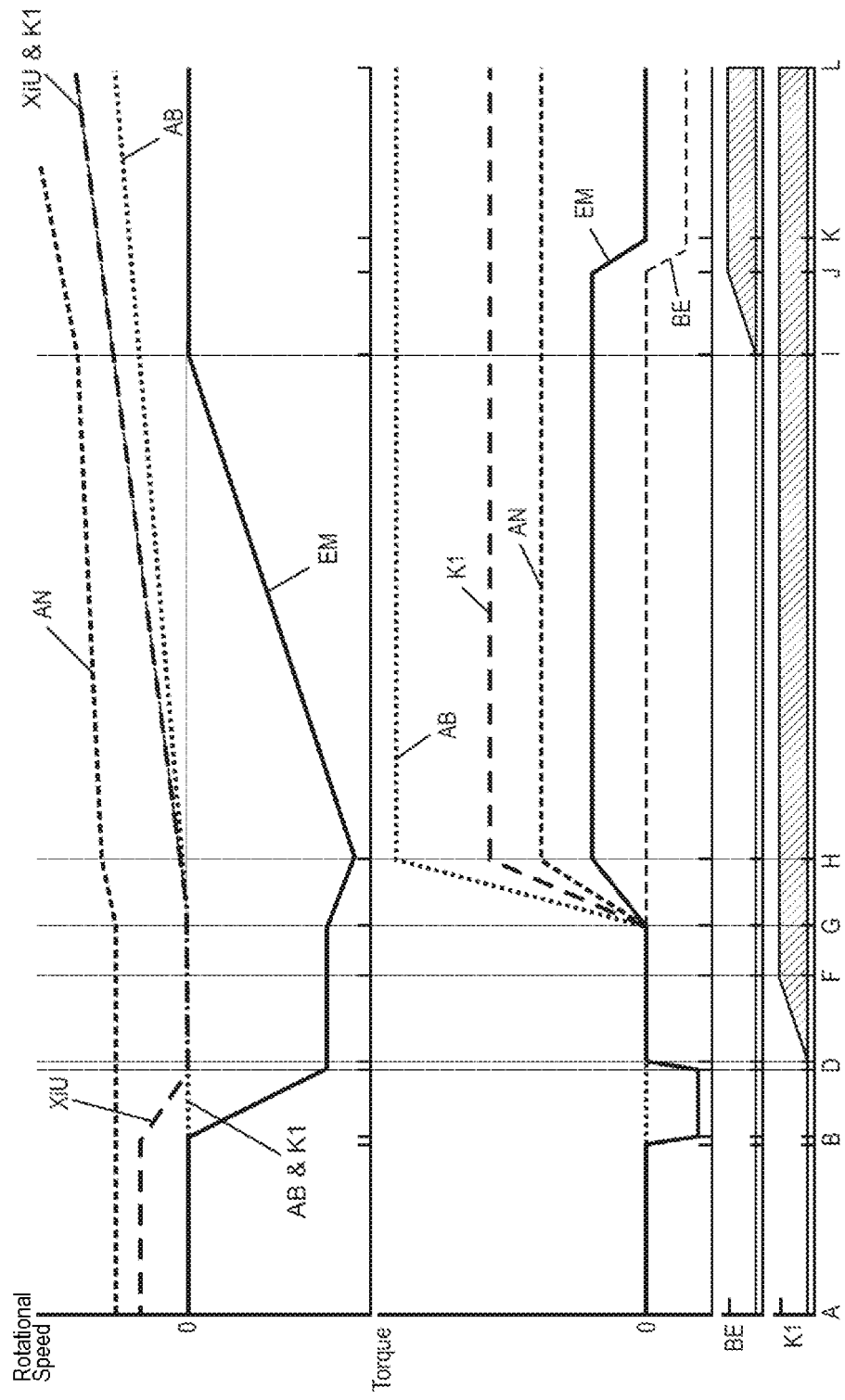

Below, sequence descriptions will be given, using diagrams with respect to time, for different driving states:

FIG. 9: Launching with Geared Neutral in the Mode V1

Launching in geared neutral is performed in the case of depleted batteries or during launching with high torque (e.g. with trailer and uphill).

Designations used:
AN=transmission input shaft (driven e.g. by the internal combustion engine),
EM=electric machine.
BE=locking of the electric machine against rotation.
AB=transmission output shaft (e.g. output to the vehicle wheels).
XiU=hollow shaft of the sub-transmission "iU" with shift element (K1) for the speed ratio I1,
K1=shift toothing: rotational speed=I1*rotational speed AB. Can be rotationally fixedly connected to the shaft XiU by means of a shift sleeve.

Starting situation: In the time range before "B", the vehicle is at idle: The internal combustion engine is rotating at idle, the electric machine is at a standstill, and XiU1 accordingly rotates. AN is static, because the vehicle is at a standstill, and K1 is therefore also static. KA is active.

At B: The controller decides that a launch process is to be prepared for (e.g. driver shifts into "drive").

B to D: The EM generates a torque, which accelerates the EM in a reverse direction. Owing to the negative rotational speed of EM, the rotational speed of XiU decreases.

At D: The rotational speed of the EM has been adapted to the rotational speed AN such that XiU is static.

D to F: K1 rotates synchronously with XiU (both static) and K1 can be closed.

F to G: Optional waiting time. For example, the driver is still standing on the brake.

G to H: The torques AN and EM are increased in controlled fashion synchronously, such that a useful torque acts at AB and the vehicle accelerates. AN acceleration optional for more torque reserves.

H to I: In the operating mode V1, the vehicle accelerates while the EM is braked to a standstill, such that the rotational speed at AN changes only slightly.

I: EM comes to a standstill. From this point in time onward, the rotational speed of AN increases proportionally to AB.

I to J: Activation of the brake BE.

J to K: Reduction of the torque of the EM. At the same time, the torque that BE must support increases.

K-L: In the operating mode G1, the EM no longer generates torque, and the vehicle accelerates in a manner driven by means of AN.

Optionally, in the time range B to D, the shaft AN can be driven by the electric machine, for example for the purposes of starting the internal combustion engine. For this purpose, from B to D, the shift elements KB and KS2 must be active and, after the starting of the internal combustion engine, at least KS2 must be opened in order to be able to synchronize K1 and XiU.

Figure 10:
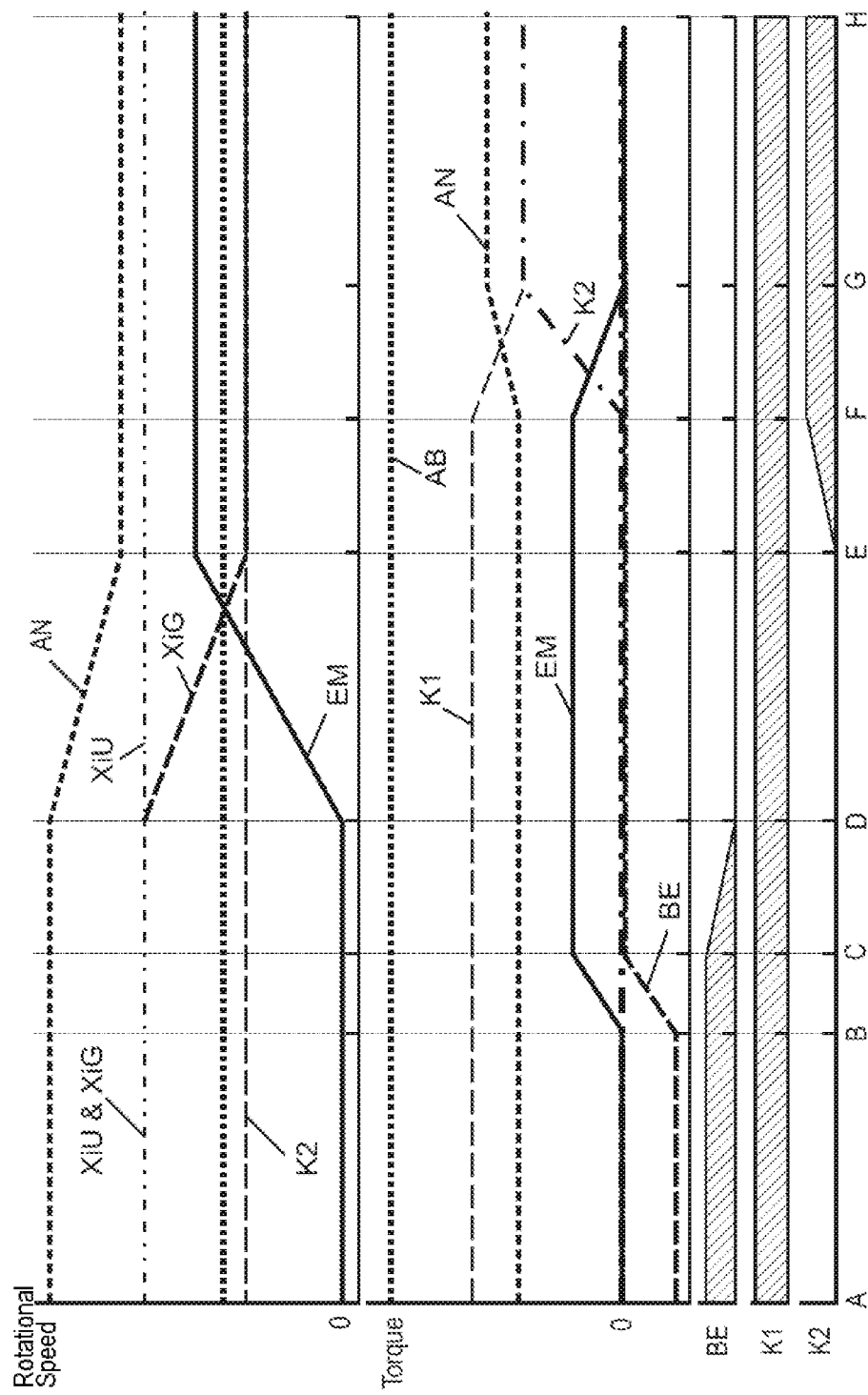

FIG. 10: Upshifting into mixed gear ratio (e.g. mode G2 to G3)

Designations used:
AN, EM, BE and AB, K1 as in FIG. 11.
XiU and XiG=hollow shafts of the sub-transmissions "iU" and "iG",
K2=similar to K1, wherein I1 must be replaced by I2, and XiU must be replaced by XiG.

Boundary conditions: The vehicle is travelling at constant speed and requires a constant drive torque. The internal combustion engine is operating in the part-load range and it is sought to achieve a more favorable operating point (higher torque, lower rotational speed) of the internal combustion engine by means of an upshift.

Starting situation: A gear ratio is engaged in one of the sub-transmissions (iU) (e.g. K1 is closed, such that I1 is active), the brake BE is active and supports the torque on the coupling of the planetary gear sets. The electric machine is at a standstill and generates no torque. XiU and XiG rotate at the same rotational speed, K2 rotates with a lower rotational speed owing to the associated speed ratio in the sub-transmission iG. Since K2 is open, XiG and K2 can rotate at different rotational speeds.

The upshift begins at "B".

"B" to "C": Withdrawal of load from BE by virtue of EM building up a torque (sign–1 owing to the speed ratio).

At "C": BE is free from load, the EM generates the entire supporting torque.

"C" to "D": BE is opened

"D" to "E": EM accelerates while, at the same time, the rotational speed at AN is reduced, such that the rotational speed of XiU remains constant (as per the above boundary conditions, the vehicle speed remains constant).

The changes in rotational speed of EM and AN however have an effect on the rotational speed XiG, such that XiG becomes slower and approaches the rotational speed of K2.

At "E": XiG and K2 rotate at approximately the same rotational speed, such that K2 can be closed.

"E" to "F": Closing of K2 is performed.

At "F": K2 is in a closed state.

"F" to "G": The torque of EM is reduced, and at the same time the torque at AN is correspondingly increased, such that the output torque AB remains constant.

"G" to "H": The EM continues to rotate in accordance with the rotational speed of the coupling between the planetary gear sets, and generates an additional torque when required (similar to the function in a P2 hybrid).

Figure 11:
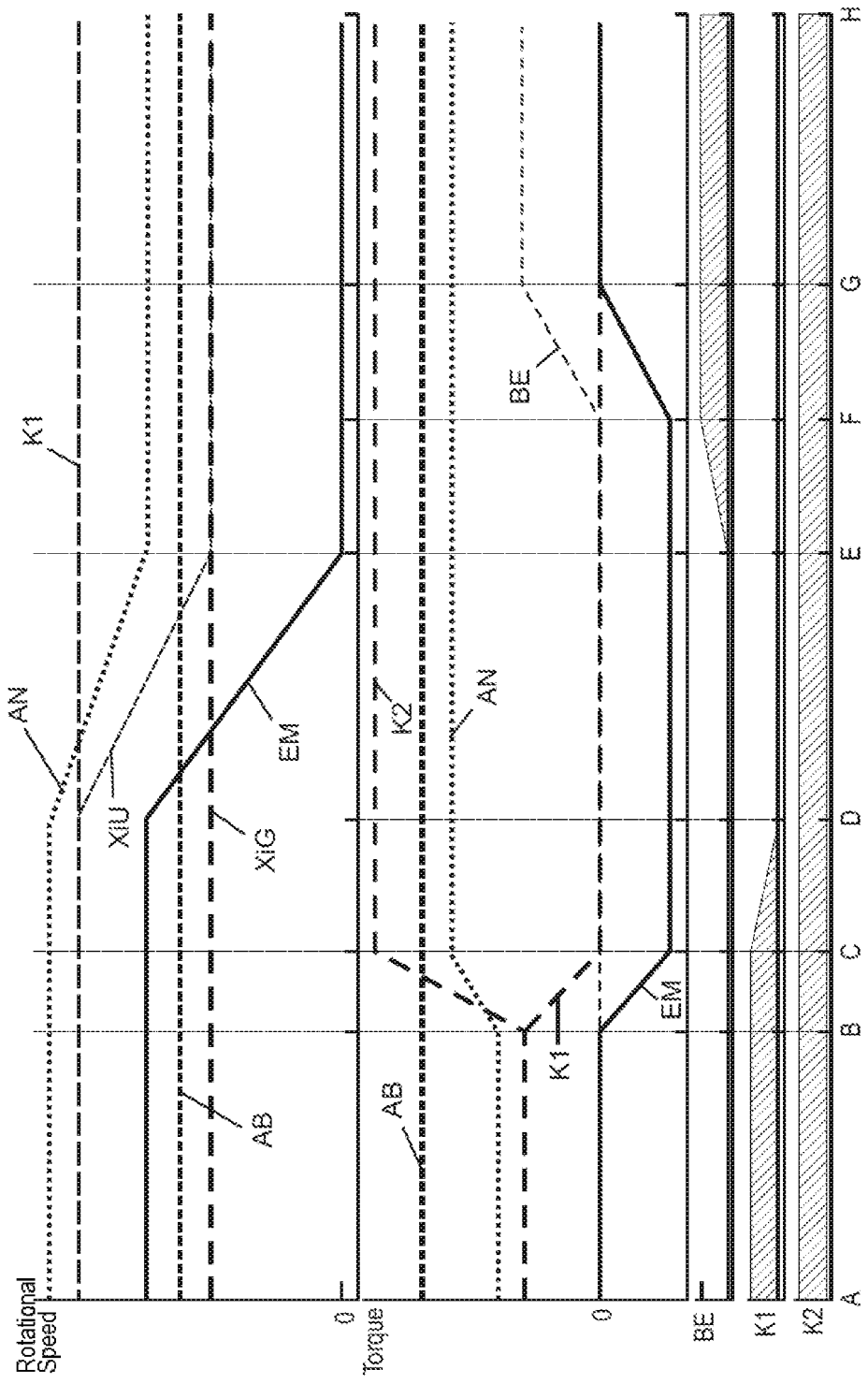

FIG. 11: Upshifting out of the mixed gear ratio (e.g. G2 to G3)

Designations used:
AN, EM, BE and AB, XiU, XiG, K1, K2 as in FIG. 11.

Boundary conditions: The vehicle is travelling at constant speed and requires a constant drive torque. The internal combustion engine is operating in the part-load range and it is sought to achieve a more favorable operating point (higher torque, lower rotational speed) of the internal combustion engine by means of an upshift.

Starting situation: A gear ratio is engaged in both sub-transmissions (iU and iG) (K1 and K2 active). K1 and K2 rotate at different rotational speeds owing to the different associated speed ratios. Since K1 and K2 are active, XiU and XiG rotate in accordance with the rotational speeds of K1 and K2. The rotational speed difference between XiU and XiG is compensated by means of the rotational speed of the coupling of the planetary gear sets, such that both planetary gear sets can be driven simultaneously by AN. The EM rotates at idle in accordance with the rotational speed of the coupling of the planetary gear sets.

The upshift begins at "B".

"B" to "C": The EM builds up a torque and thus relieves K1 of load. Since the electric machine receives mechanical power, it is simultaneously necessary for the power fed in via AN to be increased, such that the power provided at AN remains constant. The power at AN is attained by means of an increase of torque with a constant rotational speed at AN (in accordance with the boundary conditions whereby the vehicle is travelling at constant speed and with a constant drive torque).

At "C": K1 is free from load, the EM generates the entire supporting torque.

"C" to "D": K1 is opened

"D" to "E": The EM brakes to a standstill, while at the same time, the rotational speed AN is also reduced; this is performed such that the rotational speed at XiG remains constant (constant vehicle speed). The rotational speed of XiU decreases proceeding from the rotational speed K1.

At "E": The EM is at a standstill, such that BE can be closed.

"E" to "F": Closing of BE.

"F" to "G": The torque of EM is reduced, and BE takes over the supporting torque at the coupling of the planetary gear sets.

"G" to "H": EM is static, and the vehicle is driven by AN via K2.

Figure 12:
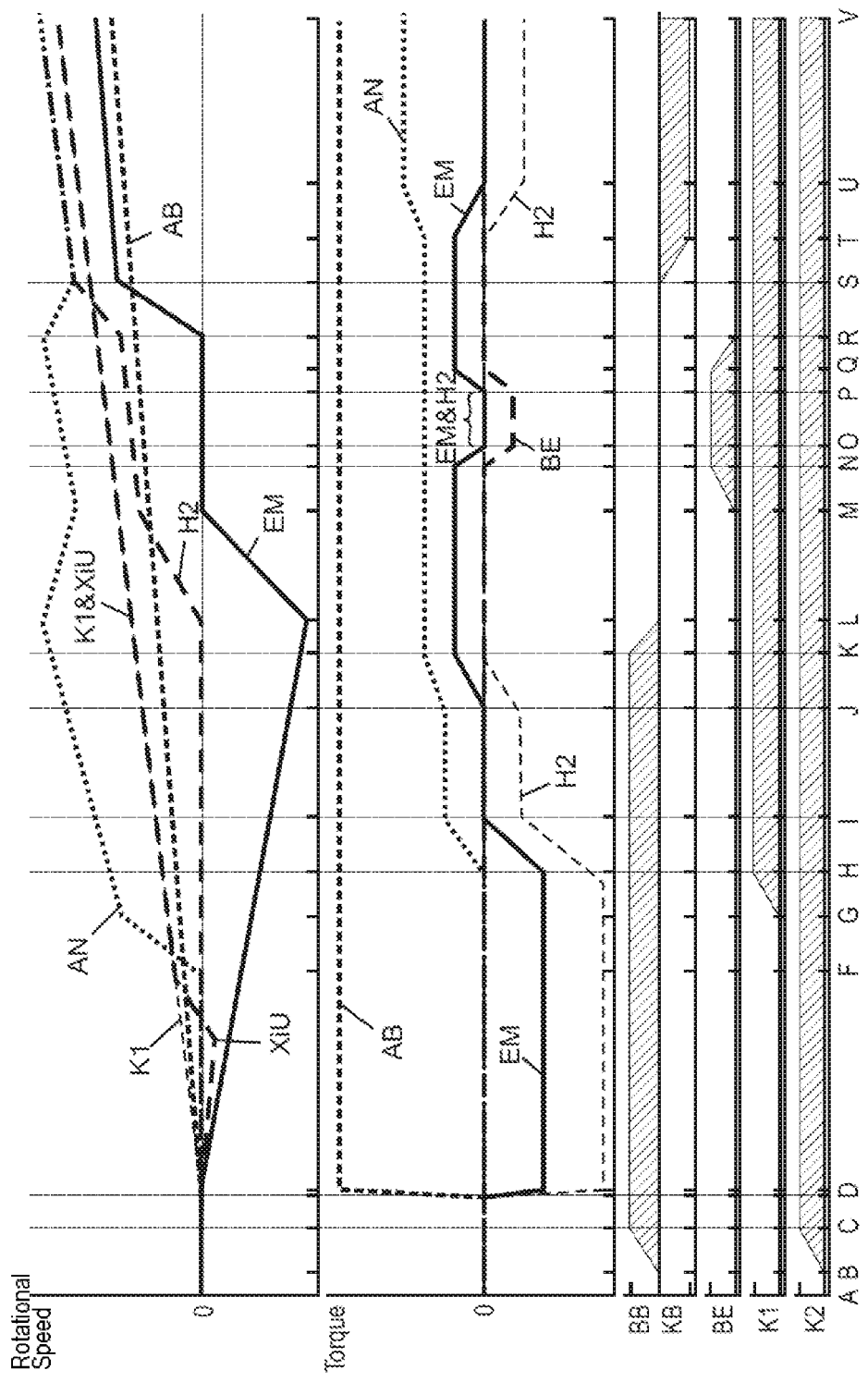

FIG. 12: Electric Driving and Transition to Hybrid Operation

Designations used:

AN, EM, BE and AB, XiU, XiG, K1, K2 as in FIG. 11.

H2=internal gear of the planetary gear set 2, which is selectively locked against rotational speed by means of BB or is rotationally fixedly connected to AN by means of KB.

Boundary conditions: The vehicle is accelerated from a standstill with a constant torque. During the upshift, the torque at AB remains constant by virtue of the torque at AN being correspondingly increased. For this purpose, the internal combustion engine has torque reserves (operates in the part-load range).

Starting situation: Vehicle is at a standstill. Rotational speed at AN, EM and AB is ZERO.

"B" to "C": Preparation for launching by activating BB and K2.

"C" to "D": Optional waiting time until launching.

"D": Start of the launch by means of electric machine.

"D" to "F": Electric machine generates torque and, on its own, accelerates the vehicle. AN remains static.

"F" to "G": Starting of the internal combustion engine at AN (e.g. by means of separate starter), and control of the rotational speed at AN such that XiU and K1 rotate synchronously.

"G" to "H": Activation of K1.

"H" to "I": Reduction of the torque of the EM to 0, and increase of the torque at AN, such that the torque at AB remains constant.

"I" to "J": Driving in E1H. AN accelerates the vehicle.

"J" to "K": Torque build-up of the EM and, in a manner adapted thereto, torque increase at AN, such that torque AB remains constant. Torque at H2 decreases to zero (BB is relieved of load).

"K" to "L": Opening of BB

"L" to "M": Reduction of the rotational speed EM to 0. Simultaneous adaptation of the rotational speed AN to the vehicle speed.

"M" to "N": Activation of BE

"N" to "O": Transfer of supporting torque from EM to BE.

"O" to "P": Driving in 2nd gear ratio (i1 active). Shift combination differs from the normal 2nd gear ratio.

"P" to "Q": Transfer of supporting torque from BE to EM

"Q" to "R": Opening of BE.

"R" to "S": Acceleration of EM such that H2 and AN rotate synchronously.

"S" to "T": Activation of KB

"T" to "U": Transfer of torque from the EM to KB, and simultaneous torque adaptation to AN for constant torque at AB.

From "U" onward: Driving in the normal 3rd gear ratio (i1 and i2 active).

Steps "M" to "R" are optional and can be skipped.

FIG. 13: Sequence with Respect to Time with Mode G9 (Economy Gear Ratio)

Designations used:

AN, EM, BE and AB, XiU, XiG, K1, K2 as in FIG. 11.

S2=sun gear of the planetary gear set P2.

KS2=shift element that can rotationally fixedly connect S2 to XiG.

Boundary conditions: The vehicle is travelling in the mode G8 using the fastest spur-gear speed ratio (I4). For the purposes of optimizing the efficiency of the internal combustion engine, the transmission controller decides that a higher speed ratio should be used. A switch is made into the mode G9. During travel in the mode G9, a higher drive power is demanded (for example in order to accelerate again). The transmission controller is therefore switched back into the mode G8.

Starting situation: The vehicle is travelling in the mode G8 with constant speed (e.g. freeway) with the internal combustion engine in the part-load range.

B to C: Transfer of torque from BE to EM

C to D: BE is opened

D to E: In the mode V4, EM accelerates in order to adapt the rotational speed of the sun gear S2 to the rotational speed of the shaft XiG. For a constant output rotational speed, it is necessary for this purpose for the rotational speed at AN to be reduced.

Point E: S2 and XiG rotate synchronously, and therefore the rotational speed difference across the shift element KS2 is likewise 0. KS2 can therefore be closed.

E to F: Closing of KS2

F to G: Transfer of torque from EM to KS2. For a constant output torque at AB, the torque at AN must be increased (XiG supports S2 via KS2).

G to H: The vehicle is travelling at constant speed in the mode G9. The internal combustion engine at AN rotates more slowly than in the presence of a higher torque.

Point H: The controller identifies an increased power demand.

H to I: Transfer of torque from KS2 to EM. The constant torque at AN thus increases the output torque at AB, because the sun gear S2 is no longer supported on XiG. EM therefore supports the drive via AN, and an increased output torque at AB is already available.

I to J: Driving in the mode G9 with boost operation by means of EM if the power is sufficient and the energy in the battery is sufficient. If this is not the case, a switch is made to another mode (following steps).

J to K: Opening of KS2 while the vehicle is already accelerating.

K to L: In the mode V4, reduction of the rotational speed of EM to a standstill. The rotational speed at AN is simultaneously increased.

L to M: Closing of BE

M to N: Transfer of torque from EM to BE.

From N onward: Onward travel in the relatively low gear ratio and drive via AN.

LIST OF REFERENCE NUMERALS

1 Transmission arrangement
2 First input interface
3 Second input interface
4 Electric motor
5 First planetary transmission section
5.1 Internal gear
5.2 Sun gear
5.3 Planet carrier
6 Second planetary transmission section
6.1 Internal gear
6.2 Sun gear
6.3 Planet carrier
7 Transmission section
8 Speed ratio transmission section
9 Speed ratio transmission section
10 Coupling section
11 Output-side coupling actuator apparatus
12 Input actuator apparatus
13 Input actuator apparatus
14 Output interface
15 First input-side coupling actuator apparatus
16 Second input-side coupling actuator apparatus
17 Clutch apparatus
AB Output interface
AB Transmission output shaft
AN Transmission input shaft
BA, BB Shift positions
BE Coupling brake device
G Frame
G1-G9 Fixed gear ratios
KA, KB Shift positions
KS2 Shift position
N Neutral state
V1-V4 Operating modes

The invention claimed is:

1. A transmission for a vehicle comprising:
a first input interface arranged for coupling to an internal combustion engine;
a second input interface arranged for coupling to an electric motor;
an output interface;
a first speed ratio transmission section comprising:
a first speed ratio transmission section input;
a first speed ratio transmission section output operatively connected to the output interface; and,
at least one first speed ratio stage;
a second speed ratio transmission section comprising:
a second speed ratio transmission section input;
a second speed ratio transmission section output operatively connected to the output interface; and,
at least one second speed ratio stage;
a first planetary transmission section comprising:
a first internal gear arranged on a first shaft, the first shaft operatively connected to the first input interface;
a first planet carrier arranged on a second shaft; the second shaft operatively connected to the second input interface; and,
a first sun gear arranged on a third shaft, the third shaft operatively connected to the first speed ratio transmission section input;
a second planetary transmission section comprising:
a second internal gear arranged on a fourth shaft, the fourth shaft operatively connected to the first input interface;
a second planet carrier arranged on a fifth shaft; the fifth shaft operatively connected to the second input interface; and,
a second sun gear arranged on a sixth shaft, the sixth shaft operatively connected to the second speed ratio transmission section input; and,
a coupling section for coupling the second shaft and the fifth shaft, wherein the second shaft and the fifth shaft are supported against one another in at least one operating mode.

2. The transmission of claim 1, wherein the coupling section is designed such that:
for a co-directional torque at the first shaft and the fourth shaft, and a co-directional torque at the third shaft and the sixth shaft:
a torque at the second shaft operates in an opposite direction to a torque at the fifth shaft.

3. The transmission of claim 1, wherein the coupling section is designed such that:
for an opposite torque at the first shaft and the fourth shaft, and an opposite torque at the third shaft and the sixth shaft:
a torque at the second shaft operates in an opposite direction to a torque at the fifth shaft.

4. The transmission of claim 1, wherein the coupling section is formed as a transmission section with a negative speed ratio.

5. The transmission of claim 1, further comprising a coupling brake device arranged to act on the coupling section.

6. The transmission of claim 5, further comprising an output-side coupling actuator apparatus, the output-side coupling actuator apparatus comprising:
the coupling brake device;
a first output-side coupling actuator apparatus input connected to the second shaft or the fifth shaft; and,
a second output-side coupling actuator apparatus input connected to the third shaft or the sixth shaft.

7. The transmission of claim 6 further comprising a frame, wherein the output-side coupling actuator apparatus is designed to:
rotationally fix the second shaft and the third shaft to one another;
rotationally fix the fifth shaft and the sixth shaft to one another;
rotationally fix the second shaft with respect to the frame and form the coupling brake device; or,
rotationally fix the fifth shaft with respect to the frame and form the coupling brake device.

8. The transmission of claim 1 further comprising:
a frame; and,
an input actuator apparatus arranged between the first input interface and the first shaft, wherein the input actuator apparatus is designed to:
rotationally fix the first input interface and the first shaft to one another; or
rotationally fix the first shaft with respect to the frame; or,
an input actuator apparatus arranged between the first input interface and the fourth shaft, wherein the input actuator apparatus is designed to:
rotationally fix the first input interface and the fourth shaft to one another; or
rotationally fix the fourth shaft with respect to the frame.

9. The transmission of claim 1, wherein:
the first shaft is formed as the first internal gear;

the second shaft is formed as the first sun gear; or, the third shaft is formed as the first planet carrier.

10. The transmission of claim 1, wherein:

the fourth shaft is formed as the second internal gear;

the fifth shaft is formed as the second sun gear; or, the sixth shaft is formed as the second planet carrier.

11. The transmission of claim 1 wherein, during a launch mode:

a launch is performed by the electric motor; and, the internal combustion engine is activated during the launch.

12. A method of operating the transmission of claim 1 in a launch mode, comprising:

activating the internal combustion engine;

initially activating the electric motor such that the second shaft and the fifth shaft are supported by the coupling section and the output interface is at a standstill; and, subsequently activating the electric motor such that a launch torque is conducted from the internal combustion engine to the output interface.

13. A vehicle having the transmission of claim 1.

\* \* \* \* \*